May 16, 1939.                    C. F. SCHWIEN                    2,158,385
                         ELECTRIC COUPLING FOR VEHICLES
                              Filed Nov. 26, 1937
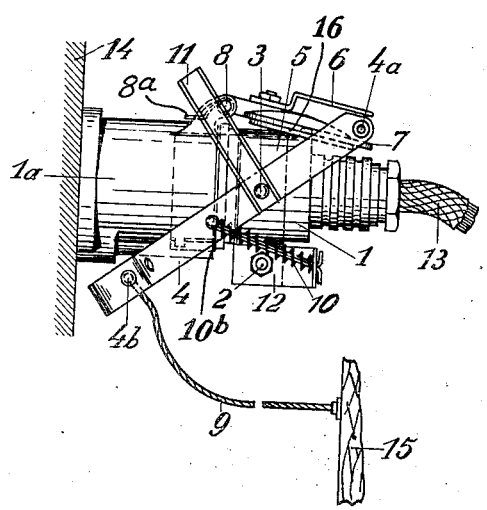
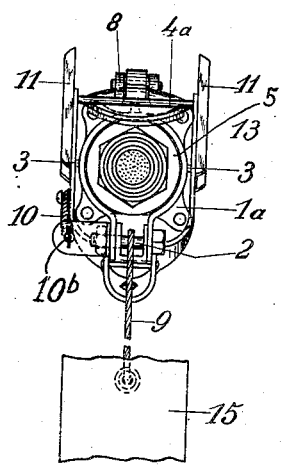
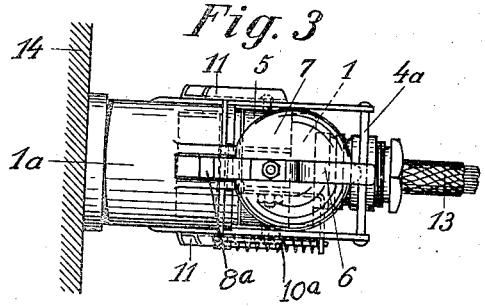
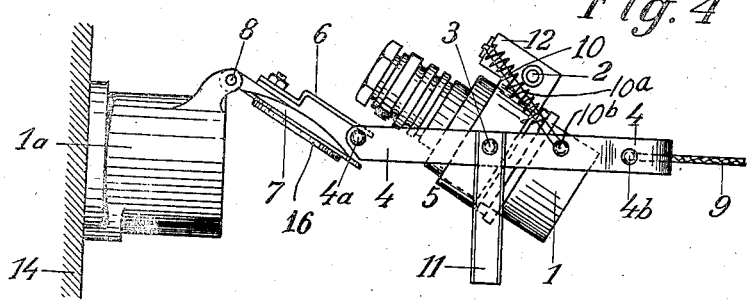
Inventor:

Patented May 16, 1939

2,158,385

UNITED STATES PATENT OFFICE 2,158,385

ELECTRIC COUPLING FOR VEHICLES

Carl Fritz Schwien, Berlin, Germany

Application November 26, 1937, Serial No. 176,677
In Germany September 2, 1936

4 Claims. (Cl. 173—332)

When a tractor is hitched to a trailer electric lighting current is usually supplied from the tractor to the trailer by a cable with a plug and socket connection, the plug being secured in the socket against accidental disengagement by a locking device.

The unlocking of the plug is effected by hand and must be carried out before the trailer is uncoupled. The unlocking is, however, difficult and often causes disturbances in contact at the connecting point, as mostly the cable is used as pull rope for drawing out the unlocked plug.

It has also happened, that the unlocking of the plug was omitted before the unlocking of the trailer. In such a case the connecting cable was broken.

The invention has for its object to produce a device for cable-connecting sockets locked in this manner and which does not only automatically unlock the plug, but pull the same out of the socket mechanically almost at the same time.

An embodiment of the invention is illustrated, by way of example, in the accompanying drawing, in which Fig. 1 shows the detaching device fixed on the plug, in side elevation and in inoperative position.

Fig. 2 is an end view of Fig. 1.

Fig. 3 is a top plan view of Fig. 1.

Fig. 4 shows in side elevation the plug completely removed and shortly before the final separation from the socket.

In the drawing, 1 designates a plug secured on the end of a cable 13 and adapted to be inserted in a socket 1a on the wall of a tractor 14 to supply current to the trailer.

When the plug 1 is not in the socket 1a, the socket is closed by a cover 7 hingedly mounted on a pin 8 and pressed into closed position by a spring 8a.

A clip 5 embraces the plug 1 and is clamped in position thereon by a bolt 2. Two diametrically opposite pins 3 project radially from the periphery of the clip 5 and the two arms 4 of a forked lever are oscillatably mounted on these pins 3 at a point intermediate their length.

A bracket 12 is fixed on the clip 5 by the bolt 2 and a rod 10a is pivotally mounted at one end on a pin 10b fixed in one of the arms 4 between the pins 3 and the united ends of the arms 4, and is slidably guided in the bracket 12. A compression spring 10 is wound on this rod 10a and bears at one end against the bracket 12 and at its other end against the pin 10b and tends to press the pin and bracket apart.

The arms 4 are connected at their free end by a transverse bar 4a and at their other end carry a bolt 4b to which a rope 9 extending from a trailer 15 is connected.

Two parallel stays 11 project at right angles one from each of the arms 4 and in conjunction with the arms 4 protect the plug against damage by impact with the ground or some obstacle when the plug is not inserted in the socket.

The cover 7 has on its outer side an angularly bent strap 6 extending from the pin 8 towards the opposite side of the cover and on its inner side a projection 16.

When the plug 1 is inserted in the socket 1a the transverse bar 4a connecting the free ends of the arms 4 engages between the strap 6 and the outer side of the cover 7 and the arms 4 are swung about the pins 3 on clip 5, causing the rod 10a to slide in the bracket 12 so that the spring 10 is compressed between this bracket 12 and the pin 10b and causes the transverse bar 4b to exert pressure on the outer side of the cover 7 and in conjunction with the spring 8a presses the cover towards plug 1 causing the projection 16 to engage the edge of clip 5 remote from the free end of plug 1, thereby locking the plug securely in the socket.

When it is desired to disconnect the tractor and trailer it is only necessary to uncouple the hitch and as soon as the vehicles commence to move apart the rope 9 on the trailer 15 exerts a pull and causes the arms 4 to turn still further about their pins 3 against the action of the spring 10a. The transverse bar 4a then exerts pressure against the strap 6 pressing the lid outwards away from the plug 1 against the action of the spring 8a so that the projection 16 disengages from the edge of clip 5 and the plug is pulled out of the socket 1a, the cover 7 being immediately forced into its closed position by the spring 8a.

Thus, the plug is withdrawn from the socket without any pull being exerted on the cable 13. As the arms 4 and stays jump back into their initial position under the action of the expanding spring 10 as soon as the socket releases the plug, the plug on dropping, is protected against damage by impact with the ground or with the rear wall of the trailer.

I claim:

1. A device for automatically disengaging plug and socket connections of electric cables between coupled vehicles, comprising in combination a socket on one vehicle, a cable extending from a second vehicle, a plug on the end of said cable adapted to be inserted in said socket, a clip clamped on said plug, a two-armed fork pivotaly mounted intermediate its length on said clip, a transverse rod connecting the free ends of the arms of said fork, a cover hingedly mounted on said socket and adapted to close said socket when connection is uncoupled, a strap on the outer side of said cover forming therewith a gap adapted to receive said transverse rod, a projection on the inner side adapted to engage the edge of said clip remote from the socket, a spring device in cooperative connection with said fork to press said transverse rod against the outer side of said cover and resiliently hold said projection in engagement position, a pull rope connected at one end to the second vehicle and at its other end to the end of said fork remote from said transverse bar and adapted when said vehicles move apart to oscillate said fork against the action of said spring to bring said transverse rod to bear aaginst said strap and move said cover outwards to disengage said projection from said clip and then to pull said plug out of said socket.

2. In a device as specified in claim 1, two parallel stays extending at right angles from the arms of the fork and forming with said arms a guard protecting the plug aaginst damage by impact.

3. In a device as specified in claim 1, a spring acting on said cover to automatically close said socket immediately the plug is removed therefrom.

4. In a device as specified in claim 1, the spring device comprising a bracket rigidly connected to the clip and having a guide hole, a pin on one arm of the fork, a rod pivotally mounted at one end on said pin and slidable at its other end in said hole, and a spring wound on said rod, and bearing at one end aaginst said bracket and at its other end against said pin and adapted to press said pin away from said bracket and return said fork in its initial position when the plug and socket are separated.

CARL FRITZ SCHWIEN.